Jan. 7, 1930.　　　P. McDONOUGH　　　1,742,608
ELECTRICAL TRANSFORMER
Filed Aug. 16, 1927
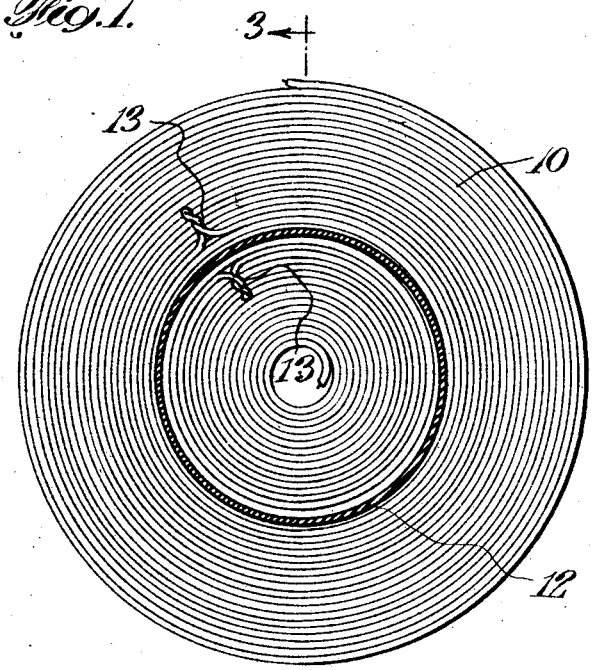
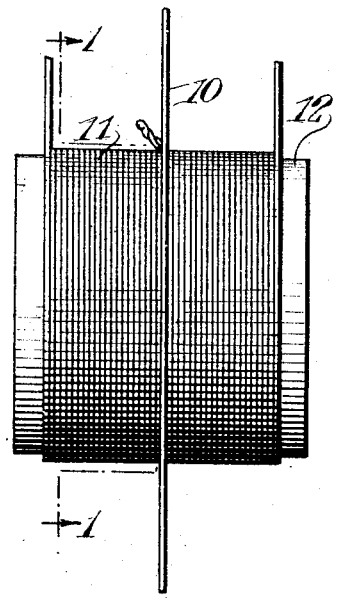
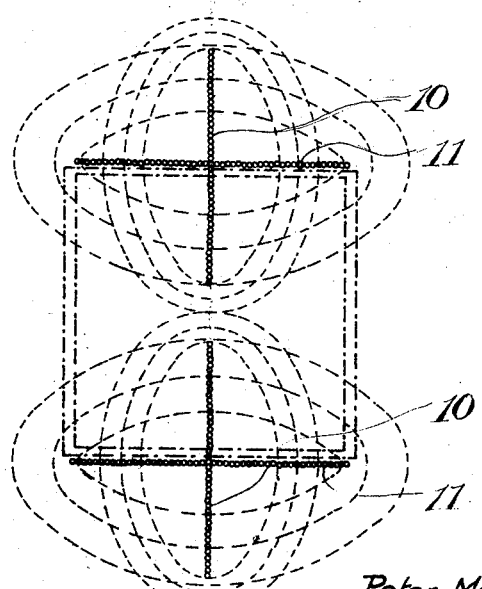
Inventor
Peter McDonough
By his Attorneys
Hoguet & Neary Patented Jan. 7, 1930

1,742,608

UNITED STATES PATENT OFFICE

PETER McDONOUGH, OF LONG ISLAND CITY, NEW YORK

ELECTRICAL TRANSFORMER

Application filed August 16, 1927. Serial No. 213,240.

This invention relates to improvements in induction coils and transformers.

The invention, in general, aims to provide a simple, novel and efficient combination, arrangement and coupling of the coils of a transformer.

It is well-known that the energy transfer between coupled coils arises from two types of coupling, electro-magnetic and electrostatic. The electro-magnetic coupling is due to the magnetic lines of force or flux of one coil traversing or cutting the windings of the other, while the electro-static coupling exists by virtue of the capacity relation between the windings of the coils. My invention provides a construction and combination of coils whereby both types of coupling are combined, an efficient electro-static coupling being obtained by reason of the spaced substantially parallel disposition of the coil windings with the surface areas of the two coils at right angles to each other and an extremely efficient electro-magnetic coupling being derived by utilizing to the greatest extent the flux of the primary windings to induce energy into the secondary windings and by minimizing the stray flux or the lines of force of the primary coil not traversing the secondary windings and consequently wasted.

In carrying out the invention and in the practice of the same, I provide an arrangement of coils such that the magnetic field of the primary coil has its axis or center substantially coincident with axis of the magnetic field of the secondary coil. By such arrangement, the coils are closely interlinked magnetically with the result that the flux of the primary is efficiently utilized to cut the windings of the secondary and to induce energy therein. The arrangement is further such that the windings of the coils are disposed in spaced substantially parallel relation with the surfaces substantially at right angles to each other so that the electro-static coupling between the coils is also efficient, the total energy transfer between the coils is large and the arrangement in general more effective than those hitherto employed.

In the preferred embodiment of the invention one of the coils, either the primary or the secondary, is spiral and the other helical and the helical coil preferably extends through the windings of the spiral coil substantially midway between the end turns thereof while the spiral coil passes through the windings of the helical coil substantially midway between the end turns thereof and is arranged substantially perpendicular to the axis thereof. In this arrangement the magnetic axes of the coils coincide, the coils are very closely interlinked magnetically and energy transfer by magnetic induction from one coil to the other is a maximum for all practical operating frequencies.

For a fuller understanding of the invention and a better and clearer comprehension thereof, reference will now be made to the accompanying drawings showing the preferred form of the invention; and wherein:

Figure 1 is a front elevational view of a device constructed in accordance with the present invention.

Figure 2 is a side elevational view thereof; showing the rectangular disposition of the surfaces.

Figure 3 is a sectional view taken as on the line 3—3 of Figure 1, showing the magnetic fields of the coils.

Referring now more particularly to the drawings which are to be considered merely as illustrative of the invention and to the details of which I do not intend to be confined, the construction disclosed comprises a spiral coil 10 and a helical coil 11, wound on a suitable supporting mandrel or tube 12. The coils are so arranged that each passes through substantially the mid point between the end turns of the windings of the other and it will be seen that there are substantially the same number of windings of the helical coil on each side of the spiral and the same number of windings of the spiral coil within the helical coil and on the exterior thereof.

The magnetic fields generated by current passing through the coils are represented in Figure 3 and by reference thereto it will be seen that the axes or centers of the magnetic fields substantially coincide. The magnetic axis of the spiral coil is a circle passing substantially midway between the end turns of the windings thereof while the magnetic axis of the helical coil is also a circle passing substantially midway between the end turns of the windings thereof. By the above described arrangement and disposition of the coils, these circles can be made to substantially coincide and consequently the coils are very closely interlinked magnetically, the magnetic field of the primary coil is utilized for induction with a minimum stray-flux loss, and the energy transfer from one to the other by magnetic induction is a maximum.

It will also be seen that in the arrangement described, the windings of the coils are disposed in spaced relation and, being approximately concentric, in substantial parallelism the consequent electrostatic capacity is controllable and may be varied as required in practice. In the ordinary transformer having two solenoids or helical coils placed end to end, the electrostatic coupling is between the edges of the coils. The maximum electrostatic coupling in such a construction may be obtained by placing one helix within the other thus bringing the surface areas of the two coils in close proximity to each other and hence increasing the electrostatic capacity. My preferred construction as above described gives a controllable electrostatic coupling because the approximate centers of the electrostatic fields coincide, thus permitting an easy passage of electrostatic energy from the one coil to the other. The electrostatic coupling may, of course, be varied and changed, by varying the size of the wires, the diameter of the coils at the intersection or coupling point of the coils or spacing the turns or windings thereof, thus varying the capacity relation between the coils. The transformer has a peculiar property in that a decrease in inductance causes an increase of capacity and an increase of inductance results in a decrease of capacity.

My invention may be applied to any transformer whatsoever, and is of general application in the electrical field. The construction disclosed is particularly adapted for use in radio circuits, and, in connection with the construction, when the transformer is being used in a regenerative circuit, conductors 13 may be tapped in on a portion of the windings of one coil, preferably the spiral coil. As shown in Figure 1, these conductors are preferably arranged at substantially the same number of windings of the spiral from the point where the helical coil passes through the spiral and on each side of said point. These conductors and the portion of the windings of the spiral coil that they shunt comprise the feed back portion of the regenerative circuit and are connected in the receiving circuit in a well known manner. The location of the conductors is such that the feed back coil, that is, the portion of the windings that the conductors shunt is subject to the most intense part of the magnetic field of the helical coil which is, in this case, the primary of the transformer and consequently the regenerative effect obtained is greatest.

Many variations and modifications of the invention may be made and resorted to without departing from basic concept thereof and I desire to be limited only by the state of the prior art and the scope of the appended claims.

In using the term "magnetic axis" in the claims, I mean the center or axis of the magnetic field generated by the current passing through the windings of the coil and around which the magnetic lines of force or flux extend in elliptic, oval or circular paths.

Having thus described my invention, what I claim as new and desire to secure by Letters Patent is:

1. A transformer comprising two coils, each extending through the windings of the other, substantially midway between the end turns thereof.

2. A transformer comprising a helical coil and a spiral coil having substantially the same number of windings within the interior of the helical coil and on the exterior thereof.

3. A transformer comprising a spiral coil and another coil having substantially the same number of windings on each side of the spiral coil, the spiral coil extending through the windings of the other coil.

4. A transformer comprising a helical coil and a spiral coil, the geometrical axes of said coils substantially coinciding.

5. A transformer comprising a helical coil and a spiral coil extending through the windings of the helical coil, substantially midway between the end turns thereof.

6. A transformer comprising a spiral coil and a helical coil extending through substantially the center of the windings of the spiral coil.

7. A transformer comprising a spiral coil and a helical coil, each passing through the windings of the other, substantially midway between the end turns thereof.

8. A transformer comprising a spiral coil and a helical coil, each passing through the windings of the other, substantially midway between the end turns thereof, and conductors tapped in on a portion of the windings of the spiral coil and arranged at substantially the same number of windings from the point where the helical coil passes through the spiral and on each side of said point.

9. A transformer comprising two coils, a spiral coil and a helical coil, said coils intersecting at their magnetic axes.

10. A transformer comprising two coils, a spiral coil and a helical coil, said coils intersecting at their magnetic axes, the surfaces of said coils being substantially at right angles to one another.

11. A transformer comprising two coils, a spiral coil and a helical coil, said coils intersecting at their magnetic axes, the windings of one coil being substantially parallel to the windings of the other coil.

In testimony whereof, I have signed my name to this specification this 10th day of August, 1927.

PETER McDONOUGH.